United States Patent
Tanaka

(10) Patent No.: US 8,416,286 B2
(45) Date of Patent: Apr. 9, 2013

(54) IMAGE SIGNAL PROCESSING DEVICE, THREE-DIMENSIONAL IMAGE DISPLAY DEVICE, THREE-DIMENSIONAL IMAGE TRANSMISSION/DISPLAY SYSTEM, AND IMAGE SIGNAL PROCESSING METHOD

(75) Inventor: Tetsuro Tanaka, Tokyo (JP)

(73) Assignee: Sony Corporation (JP)

( * ) Notice: Subject to any disclaimer, the term of this patent is extended or adjusted under 35 U.S.C. 154(b) by 417 days.

(21) Appl. No.: 12/661,017

(22) Filed: Mar. 9, 2010

(65) Prior Publication Data

US 2010/0245547 A1 Sep. 30, 2010

(30) Foreign Application Priority Data

Mar. 19, 2009 (JP) ................ P2009-068971

(51) Int. Cl.
*H04N 9/47* (2006.01)
*H04N 13/04* (2006.01)
(52) U.S. Cl.
USPC ............... 348/53; 348/51; 382/234; 382/300
(58) Field of Classification Search .............. 348/51, 348/53; 382/234, 300
See application file for complete search history.

(56) References Cited

U.S. PATENT DOCUMENTS

| 7,450,784 B2 * | 11/2008 | Nishimura ............... 382/300 |
| 2002/0021261 A1 | 2/2002 | Werner |
| 2008/0152241 A1* | 6/2008 | Itoi et al. ............... 382/234 |
| 2009/0051759 A1* | 2/2009 | Adkins et al. ............... 348/53 |

FOREIGN PATENT DOCUMENTS

| JP | 57119584 A | 7/1982 |
| JP | 03256498 A | 11/1991 |
| JP | 04360394 A | 12/1992 |
| JP | 2000-258697 A | 9/2000 |
| JP | 2002095017 A | 3/2002 |
| JP | 2007274411 A | 10/2007 |
| WO | 2007125415 A2 | 11/2007 |

OTHER PUBLICATIONS

European Search Report EP 10156512 dated, Jun. 10, 2010.
Office Action from Japanese Application No. 2009-068971, dated Nov. 20, 2012.

* cited by examiner

*Primary Examiner* — Kyung H Shin
(74) *Attorney, Agent, or Firm* — Lerner, David, Littenberg, Krumholz & Mentlik, LLP

(57) ABSTRACT

An image signal processing device improving quality of three-dimensional image is provided. The device includes a determination section; deinterlace sections and a synchronous control section. The determination section determines whether first and/or second input image signals, having horizontal parallax there between, are interlaced signals derived from video signal or from pull down-converted film signal. The deinterlace sections perform deinterlace on each of the first and second input image signals, through interpolation for a video signal or pull down reverse conversion for a film signal, and generate first and second output image signals as progressive signals, having horizontal parallax there between. The synchronous control section synchronously controls the deinterlace, based on result of the determination section, such that deinterlace process onto the first and second input image signals, synchronized with each other for each of fields, are of same type.

11 Claims, 13 Drawing Sheets

IMAGE SIGNAL PROCESSING DEVICE, THREE-DIMENSIONAL IMAGE DISPLAY DEVICE, THREE-DIMENSIONAL IMAGE TRANSMISSION/DISPLAY SYSTEM, AND IMAGE SIGNAL PROCESSING METHOD

CROSS-REFERENCE TO RELATED APPLICATION

The present application claims priority from Japanese Patent Application No. JP 2009-068971 filed in the Japanese Patent Office on Mar. 19, 2009, the entire content of which is incorporated herein by reference.

BACKGROUND OF THE INVENTION

1. Field of the Invention

The present invention relates to an image signal processing device and an image signal processing method used in displaying a three-dimensional image, and relates to a three-dimensional image display device and a three-dimensional image transmission/display system having the image signal processing device each.

2. Description of Related Art

Various types of three-dimensional image display systems have been proposed in the past. A field-sequential (time-divisional), three-dimensional image display system using horizontal parallax images is given as one of the systems (for example, see Japanese Patent Application, Publication No. 2000-258697).

In such a type of three-dimensional image display system, a three-dimensional image is achieved by alternately displaying left-eye images and right-eye images in time division. A viewer uses a shutter-glass-type cutoff device performing switching operation in synchronization with each of images for left and right eyes, and thus may view a three-dimensional image.

SUMMARY OF THE INVENTION

In such a field sequential, three-dimensional image display system, when deinterlace is performed to an image signal including an interlace signal received from a broadcasting station or the like, deinterlace using pull down reverse conversion has not been used in the past. Pull down conversion means PI (progressive/interlace) conversion of converting a progressive signal to an interlace signal. Specifically, for example, conversion of an original image to two interlaces signals (images) of even and odd fields are called 2-2 pull down conversion. In addition, for example, conversion of an original image to interlace signals including two or three, alternate images is called 2-3 (or 3-2) pull down conversion. Such pull down conversion enables conversion into an interlace signal of NTSC (National Television Standards Committee), PAL (Phase Alternation by Line), hi-vision or the like. Conversely, the deinterlace of converting interlace signals to an original progressive signal is called pull down reverse conversion. The pull down reverse conversion is indispensable processing for improving image quality of a recent fixed-pixel liquid crystal television or the like.

In the field sequential (time-divisional), three-dimensional image display system using horizontal parallax images, it is considered that deinterlace using the pull down reverse conversion is independently performed for each of an image signal for a left eye and an image signal for a right eye. However, since a left-eye image and a right-eye image have parallax and therefore are different from each other, pull down detection results given in deinterlace are not necessarily the same between respective image signals for left and right eyes. Specifically, deinterlace applied to respective image signals for left and right eyes may be separated into processing using pull down reverse conversion and processing without using pull down reverse conversion (for example, deinterlace for a video signal). In such a case, image quality becomes different between a left-eye image and a right-eye image, causing stress in a viewer of a three-dimensional image (causing increased sense of discomfort in image quality).

It is desirable to provide an image signal processing device, an image signal processing method, a three-dimensional image display device, and a three-dimensional image transmission/display system, in each of which sense of discomfort in image quality may be reduced during viewing a three-dimensional image.

An image signal processing device according to an embodiment of the invention includes: a determination section performing determination, for each of fields, on a first input image signal as an interlaced signal or a second input image signal as an interlaced signal having horizontal parallax to the first input image signal or both thereof, the determination being concerned with whether an input image signal is an interlaced signal derived from video signal or from pull down-converted film signal; deinterlace sections performing deinterlace, for each of fields, on each of the first and second input image signals, through use of interpolation for a video signal or pull down reverse conversion for a film signal, thereby generating a first output image signal as a progressive signal and a second output image signal as a progressive signal having horizontal parallax to the first output image signal; and a synchronous control section performing synchronous control to the deinterlace sections, based on a determination result of the determination section, such that deinterlace applied to the first input image signal and deinterlace applied to the second input image signal, synchronized with each other for each of fields, are of same type.

An image signal processing method according to an embodiment of the invention includes steps of: performing determination, for each of fields, on a first input image signal as an interlaced signal or a second input image signal as an interlaced signal having horizontal parallax to the first input image signal or both thereof, the determination being concerned with whether an input image signal is an interlaced signal derived from video signal or from pull down-converted film signal; performing deinterlace, for each of fields, on each of the first and second input image signals, through use of interpolation for a video signal or pull down reverse conversion for a film signal, thereby generating a first output image signal as a progressive signal and a second output image signal as a progressive signal having horizontal parallax to the first output image signal; and performing synchronous control in the step of performing deinterlace, based on a determination result in the step of performing determination, such that deinterlace applied to the first input image signal and deinterlace applied to the second input image signal, synchronized with each other for each of fields, are of same type.

A three-dimensional image display device according to an embodiment of the invention includes the determination section, the deinterlace sections, the synchronous control section, and a display section alternately displaying, in time division, left-eye image based on the first output image signal and right-eye image based on the second output image signal.

A. three-dimensional image transmission/display system according to an embodiment of the invention includes a transmission device transmitting first input image signal as an interlaced signal or a second input image signal as an interlaced signal having horizontal parallax to the first input image signal; and the three-dimensional image display device receiving the first and second input image signals transmitted from the transmission device, and performing three-dimensional image display based on the first and second input image signals; in which the transmission device has a parallel-serial conversion section transmitting the first and second input image signals to the three-dimensional image display device in time division.

In the image signal processing device, the image signal processing method, the three-dimensional image display device, and the three-dimensional image transmission/display system according to the embodiment of the invention, the determination is performed, for each of fields, on a first input image signal or a second input image signal, or both thereof, the determination being concerned with whether an input image signal is an interlaced signal derived from video signal or from pull down-converted film signal. In addition, deinterlace is performed, for each of fields, on each of the first and second input image signals, through use of interpolation for a video signal or pull down reverse conversion for a film signal, thereby generating a first output image signal and a second output image signal. Synchronous control to the deinterlace is performed, based on the above determination result, such that deinterlace applied to the first input image signal and deinterlace applied to the second input image signal, synchronized with each other for each of fields, are of same type. Thus, a difference in image quality is reduced (preferably avoided) between a left-eye image based on the first output image signal and a right-eye image based on the second output image signal.

According to the image signal processing device, the image signal processing method, the three-dimensional image display device, and the three-dimensional image transmission/display system of the embodiment of the invention, the determination is performed on a first input image signal or a second input image signal, or both thereof, and synchronous control to the deinterlace is performed, based on the above determination result, such that deinterlace applied to the first input image signal and deinterlace applied to the second input image signal, synchronized with each other for each of fields, are of same type. Therefore, a difference in image quality may be reduced or avoided between a left-eye image based on the first output image signal and a right-eye image based on the second output image signal, so that sense of discomfort in image quality may be reduced during viewing a three-dimensional image.

Other and further objects, features and advantages of the invention will appear more fully from the following description.

DETAILED DESCRIPTION OF THE PREFERRED EMBODIMENTS

Hereinafter, a preferred embodiment of the invention will be described in detail with reference to drawings. The description is made in the following sequence.

1. Embodiment (case of using synchronous control processing in deinterlace

2. Modifications (modifications 1 and 2; case where one of pulldown detection processing for L and R is substituted by the other)

1. Embodiment

Figure 1:
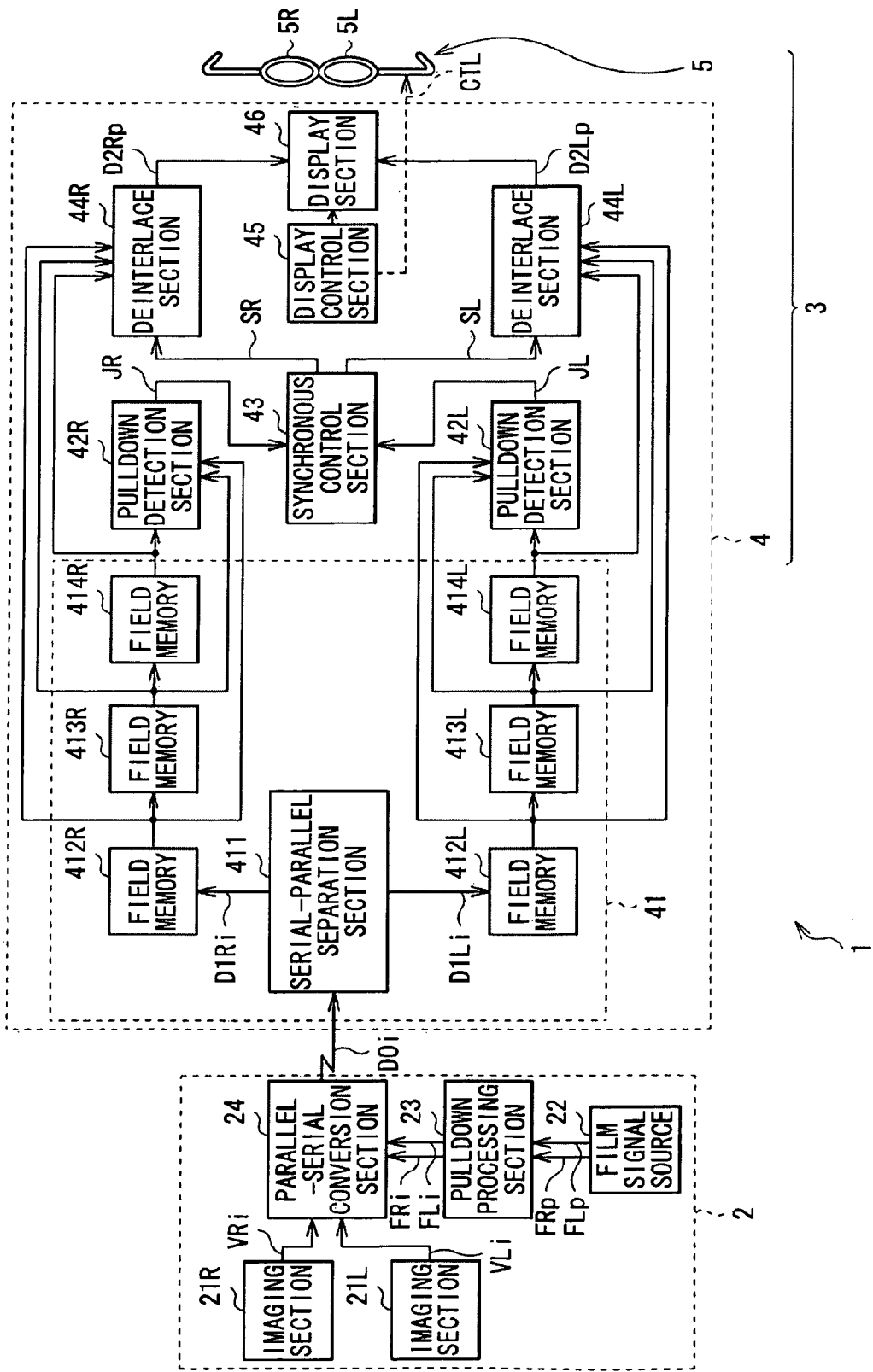
FIG. 1 is a functional block diagram illustrating a configuration of a three-dimensional image transmission/display system according to an embodiment of the invention.

General Configuration Example of Three-dimensional Image Transmission/display System FIG. 1 shows a functional block configuration of a three-dimensional image transmission/display system 1 according to an embodiment of the invention. The three-dimensional image transmission/display system 1 performs generation, transmission, and display of a three-dimensional image, and has a transmission device 2 being a section performing generation and transmission of a three-dimensional image, and a three-dimensional image display system 3 being a section performing display of the three-dimensional image. The three-dimensional image display system 3 is a field sequential (temporally series), three-dimensional image display system, and has a three-dimensional image display device (display device 4) according to an embodiment of the invention, and a shutter glass 5. Since an image signal processing method according to an embodiment of the invention is embodied in the display device 4, the method is described together below.

Transmission Device 2

The transmission device 2 generates a transmission signal D0i corresponding to a three-dimensional image, and transmits the signal to the display device 4, and has an imaging sections 21L and 21R, a film signal source 22, a pulldown processing section 23, and a parallel-serial conversion section 24.

The imaging section 21L takes an image of an object (not illustrated), thereby generates a video signal VLi including an interlace signal as a left-eye image signal of a three-dimensional image. The imaging section 21R takes an image of an object, thereby generates a video signal VRi including an interlace signal as a right-eye image signal of a three-dimensional image. That is, the imaging sections 21L and 21R includes, for example, an interlace camera each. The generated video signals VLi and VRi are image signals having horizontal parallax between them.

The film signal source 22 outputs film signals FLp and FRp including progressive signals as image signals for left and right eyes, respectively. The film signals FLp and FRp are image signals having horizontal parallax between them. Such a film signal source 22 includes, for example, a Film camera, a progressive output video camera, and a CG (computer graphic) image.

The pulldown processing section 23 performs pulldown conversion to each of the film signals FLp and FRp inputted from the film signal source 22, thereby outputs film signals FLi and FRi including interlace signals as image signals for left and right eyes, respectively. Such pulldown conversion includes, for example, 2-3 (or 3-2) pulldown conversion of converting 24P material (24 (frames/sec) progressive signals) to 60I (60 (fields/sec) interlace signals). Other examples include 2-2 pulldown conversion of converting 30P material to 60I, 2-2 pulldown conversion of converting 25P material to 50I, 4-6 pulldown conversion of converting 12P material to 60I, and 7-8 pulldown conversion of converting 8P material to 60I. In the embodiment, the following description will be basically made on a case of performing 2-3 pulldown conversion.

The parallel-serial conversion section 24 transmits transmission data D0i to the display device 4, the transmission data being the video signals VLi and VRi inputted temporally parallel from the imaging sections 21L and 21R, or the film signals FLi and FRi inputted temporally parallel from the pulldown processing section 23. In such transmission, the parallel-serial conversion section 24 allows the video signal VLi or the film signal FLi for a left eye and the video signal VRi or the film signal FRi for a right eye to be temporally in series (serial) (performs parallel-serial conversion), thereby generates the transmission data D0i.

Display Device 4

The display device 4 receives the transmission data D0i transmitted from the transmission device 2, and performs three-dimensional image display based on the transmission signal D0i. The display device 4 has a serial-parallel conversion section 41, pulldown detection sections 42L and 42R, a synchronous control section 43, deinterlace sections 44L and 44R, a display control section 45, and a display section 46.

The serial-parallel conversion section 41 receives the transmission data D0i transmitted from the transmission device 2, and performs serial-parallel conversion to the transmission data D0i. The serial-parallel conversion section has a serial-parallel separation section 411, field memories 412L, 413L and 414L, and field memories 412R, 413R and 414R.

The serial-parallel separation section 411 receives the transmission data D0i transmitted from the transmission device 2, and separates the transmission data D0i into an image signal D1Li for a left eye and an image signal D1Ri for a right eye. Each of the image signals D1Li and D1Ri is an interlace signal including a video signal or a film signal. In such separation operation, since the transmission data D0i have been necessarily encoded into a serial signal, the serial-parallel separation section 411 decodes the data based on information of the signal to perform separation.

The field memories 412L, 413L and 414L store the video signal D1Li for a left eye as needed, and the field memories 412R, 413R and 414R store the video signal D1Ri for a right eye as needed. Here, assuming a case where deinterlace sections 44L and 44R described later perform deinterlace using 2-3 pulldown reverse conversion, field memories for three fields are assumed to be provided for each of left and right eyes. When deinterlace is performed using, for example, 5-5 pulldown reverse conversion or 7-8 pulldown reverse conversion, more field memories need to be provided. An image signal of a present field (the latest field; the same is true below) is outputted from each of the field memories 412L and 412R. An image signal of a previous field (past 1) is outputted from each of the field memories 413L and 413R, and an image signal of a field before the previous field (past 2) is outputted from each of the field memories 414L and 414R.

The pulldown detection section 42L performs predetermined pulldown detection processing based on each of the image signals of the present, the past 1 and the past 2 for a left eye outputted from the field memories 412L, 413L and 414L, and outputs a detection result signal JL to the synchronous control section 43. The pulldown detection section 42R performs predetermined pulldown detection processing based on each of the image signals of the present, the past 1 and the past 2 for a right eye outputted from the field memories 412R, 413R and 414R, and outputs a detection result signal JR to the synchronous control section 43. Specifically, the pulldown detection section 42L or 42R detects 3-2 pulldown, 2-2 pulldown or the like from the image signal of each of the fields, thereby detects whether a field being a processing object is resulted from a film image or not. In other words, the pulldown detection section performs determination processing, in fields, whether an image signal being a processing object is an interlace signal including a video signal or an interlace signal including a pulldown-converted film signal. In such detection processing (determination processing), in the case of a field in a signal region converted into interlace signals by the pulldown conversion, since a field resulted from the same frame necessarily exists as an adjacent field, the detection processing is performed by using the adjacent field. Specifically, for example, a field sequence is detected based on presence of interfield motion (interfield correlation), thereby 3-2 pulldown, 2-2 pulldown or the like may be detected.

The deinterlace section 44L performs deinterlace to an image signal for a right eye in fields by using each of the image signals of the present, the past 1 and the past 2 for a left eye outputted from the field memories 412L, 413L and 414L. The deinterlace section 44R performs deinterlace to an image signal for a left eye in fields by using each of the image signals of the present, the past 1 and the past 2 for a right eye outputted from the field memories 412R, 413R and 414R. Specifically, the deinterlace sections 44L and 44R perform deinterlace using interpolation processing for a video signal or pulldown reverse conversion for a film signal to generate image signals D2Lp and D2Rp being progressive signals for left and right eyes, respectively.

When each deinterlace section performs deinterlace using the interpolation processing for a video signal, the section performs interfield interpolation processing or innerfield interpolation processing based on a predetermined motion detection result, thereby generates a progressive signal. Specifically, when an image is still, the deinterlace section performs interfield interpolation in which an average value of previous and next pixels is set to a new pixel, and thus forms a new scan line. When an image is moving, the deinterlace section performs innerfield interpolation in which an average value of upper and lower pixels is set to a new pixel, and thus forms a new scan line. In contrast, when each deinterlace section performs deinterlace using the pulldown reverse conversion for a film signal, since a field resulted from the same frame necessarily exists as an adjacent field, the section generates a progressive signal by using the adjacent field.

The synchronous control section 43 performs synchronous control such that deinterlace for a left eye used by the deinterlace section 44L and deinterlace for a right eye used by the deinterlace section 44R are synchronized with each other in fields so that the same type of processing is used. Specifically, based on the detection result signals JL and JR outputted from the pulldown detection sections 42L and 42R, the synchronous control section performs synchronous control such that the same type of deinterlace (interpolation processing for a video signal or pulldown reverse conversion for a film signal) is performed for each of left and right eyes. Such synchronous control is achieved by outputting synchronous control signals SL and SR to the deinterlace sections 44L and 44R, respectively. Detailed operation of the synchronous control section 43 will be described later The display control section 45 outputs a signal for display control to the display section 46. The display control section 45 outputs a shutter-timing control signal (control signal CTL) to the shutter glass 5 described later in synchronization with display timing of an image for each of left and right eyes. While the control signal CTL is shown as a radio signal such as an infrared signal herein, the control signal may be a cable signal.

The display section 46 alternately displays, in time division, a left-eye image based on the image signal D2Lp outputted from the deinterlace section 44L and a right-eye image based on the image signal D2Rp outputted from the deinterlace section 44R. That is, the display section 46 performs field sequential display for three-dimensional image display. As such a display section 46, for example, various displays such as LCD (Liquid Crystal Display), PDP (Plasma Display Panel), and an organic EL (Electro Luminescence) display may be used.

Shutter Glass 5

The shutter glass 5 is used by a viewer (not illustrated in FIG. 1) of the display device 4 so as to enable viewing of a three-dimensional image, and includes a left-eye lens 5L and a right-eye lens 5R.

The left-eye lens 5L and the right-eye lens 5R have a light-shielding shutter such as liquid crystal shutter each. A light-shielding function of the light-shielding shutter is optionally controlled to be valid or invalid by the control signal CTL supplied from the display control section 45.

The display device 4 corresponds to a specific example of the "three-dimensional image display device" of the invention. The pulldown detection sections 42L and 42R, the deinterlace sections 44L and 44R, and the synchronous control section 43 collectively correspond to a specific example of the "image signal processing device" of the invention. The pulldown detection sections 42L and 42R correspond to a specific example of the "determination section" of the invention. The video signal VLi or the film signal FLi and the image signal D1Li correspond to a specific example of the "first input image signal" of the invention each. The video signal VRi or the film signal FRi and the image signal D1Ri correspond to a specific example of the "second input image signal" of the invention each. The image signal D2Lp corresponds to a specific example of the "first output image signal" of the invention, and the image signal D2Rp corresponds to a specific example of the "second output image signal" of the invention.

Operation And Effects of Three-Dimensional Image Display System

Next, operation and effects of the three-dimensional image transmission/display system 1 of the embodiment will be described.

First, basic operation of the three-dimensional image transmission/display system 1 is described with reference to FIGS. 1 to 8A and 8B.

Processing Flow In the Case of Transmitting Video Signal

Figure 2:
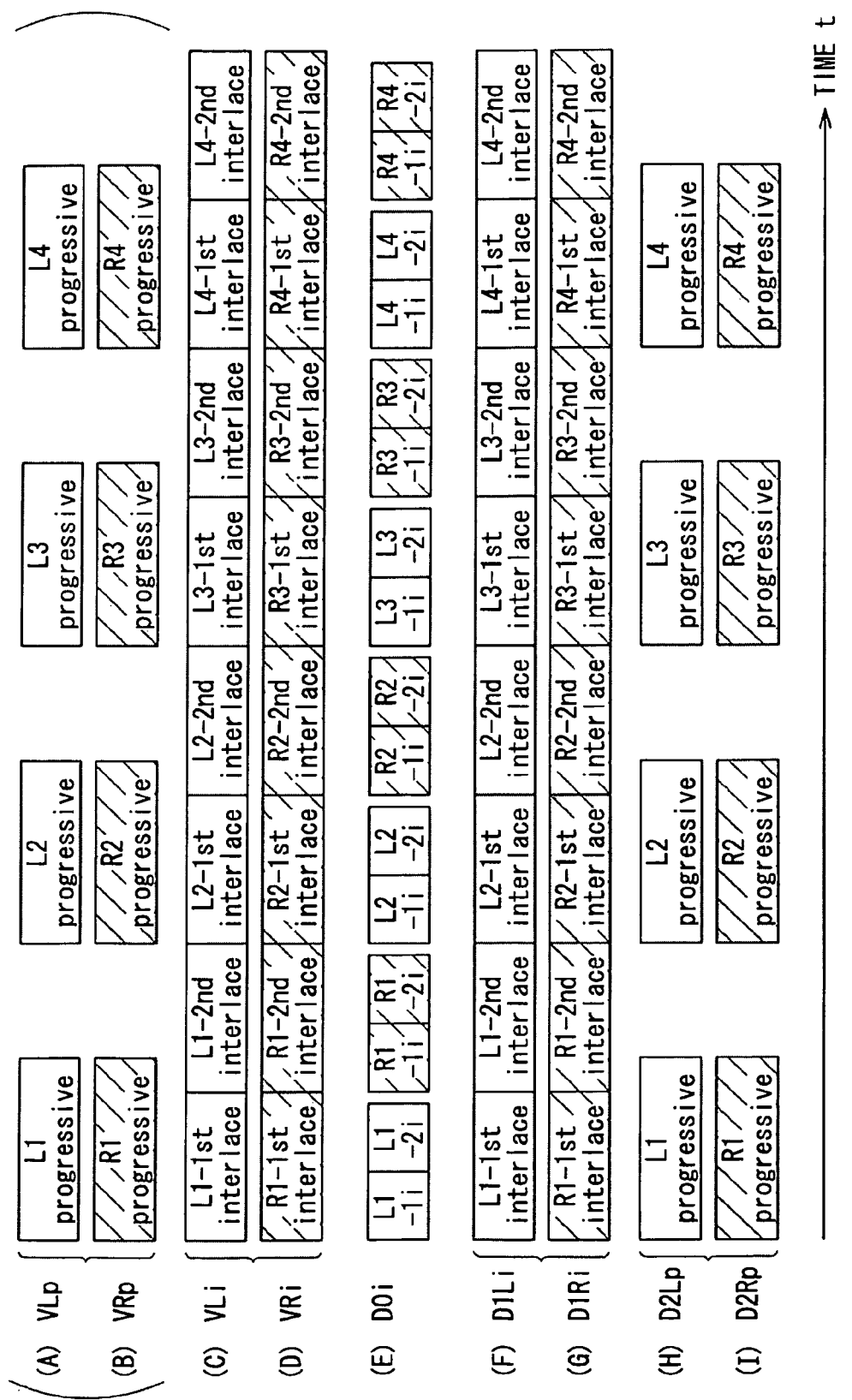
FIG. 2 is a timing chart illustrating an example of processing flow of an image signal during transmitting a video signal in the three-dimensional image transmission/display system illustrated in FIG. 1.
Figure 5:
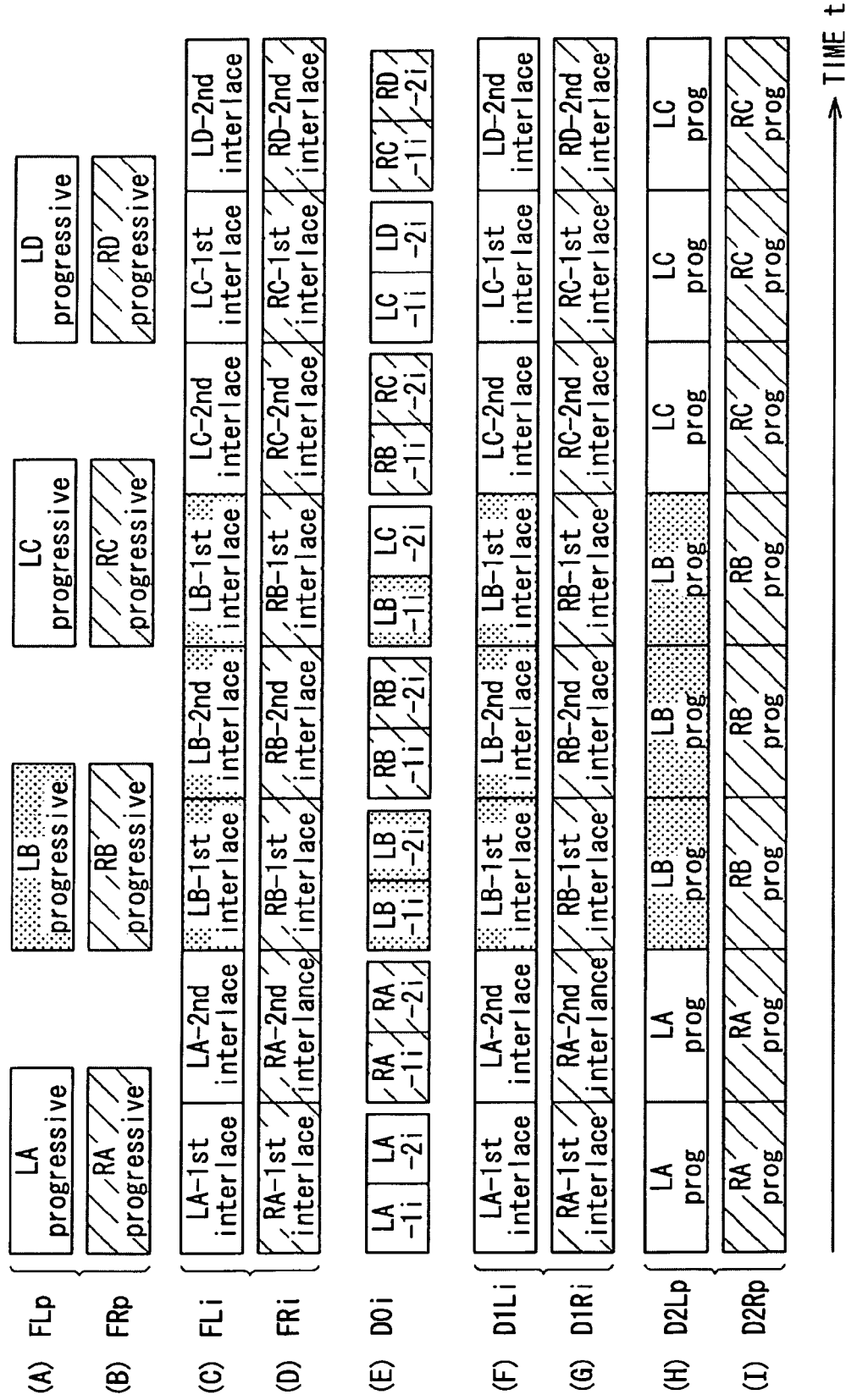
FIG. 5 is a timing chart illustrating an example of processing flow of an image signal during transmitting a film signal in the three-dimensional image transmission/display system illustrated in FIG. 1.

FIG. 2 is a timing chart illustrating an example of processing flow of an image signal in transmission of a video signal in the three-dimensional image transmission/display system 1. Part (C) and part (D) in FIG. 2 illustrate the video signals VLi and VRi outputted from the imaging sections 21L and 21R, and part (E) in FIG. 2 illustrates the transmission signal D0i transmitted from the transmission device 2 to the display device 4, respectively. Part (F) and part (G) in FIG. 2 illustrate image signals D1Li and D1Ri outputted from the serial-parallel separation section 411, and part (H) and (I) in FIG. 2 illustrate image signals D2Lp and D2Rp outputted from the deinterlace sections 44L and 44R, respectively. Part (A) and part (B) in FIG. 2 supposedly illustrate video signals VLp and VRp for left and right eyes being progressive signals as sources of the video signals VLi and VRi for reference, respectively. In the figure, "L1" to "L4" and "R1" to "R4" show video signals of frames different from one another for left and right eyes, respectively. In FIGS. 2 and 5 described later, absolute time axes of respective signals are not corresponding to one another.

In this case, in the three-dimensional image transmission/display system 1, when the imaging sections 21L and 21R in the transmission device 2 take an image of an object (not illustrated), the video signals VLi and VRi are generated, respectively. Then, the parallel-serial conversion section 24 performs parallel-serial conversion to the video signals VLi and VRi, thereby generates the transmission signal D0i. Thus, the video signal VLi for a left eye and the video signal VRi for a right eye are transmitted in time division to the serial-parallel separation section 411 in the display device 4.

In such processing, the parallel-serial conversion section 24 alternately transmits the video signal VLi for a left eye and the video signal VRi for a right eye in time division while successively arranging respective video signals of first and second fields along a time axis. Specifically, the transmission data D0i (part (E) in FIG. 2) are transmitted in order of "L1-first interlace", "L1-second interlace", "R1-first interlace", "R1-second interlace", "L2-first interlace", "L2-second interlace", and so on. This is because since a phase difference vertically exists in sampling position between the first and second fields, a field signal for a left eye and a field signal for a right eye are hardly alternately transmitted.

Next, the serial-parallel separation section 411 in the display device 4 receives the transmission data D0i transmitted from the parallel-serial conversion section 24 in the transmission device 2, and performs serial-parallel conversion of the data, and then supplies image signals for left and right eyes to the field memories 412L and 412R and the like, respectively.

Next, each of the pulldown detection sections 42L and 42R uses the image signals of three fields supplied from the field memories 412L and 412R and the like to detect whether a field being a processing object is resulted from a film image or not. Here, the field being a processing object is determined to be not resulted from a film image (corresponding to an interlace signal including a video signal).

Figures 3A, 3B, 3C:
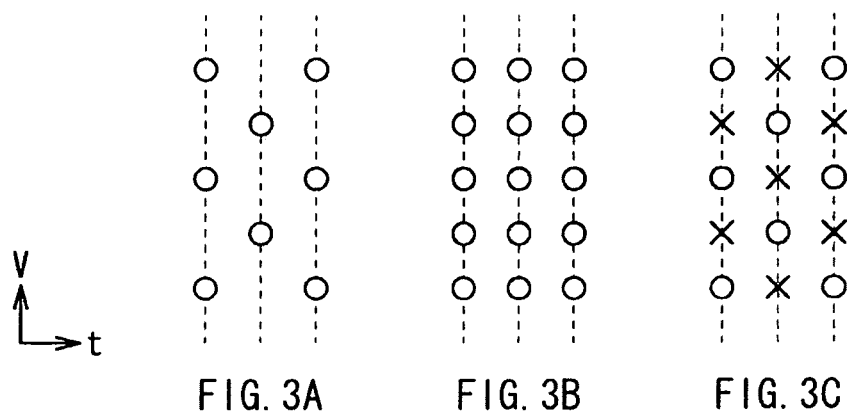
FIGS. 3A to 3C are schematic diagrams for illustrating an outline of deinterlace applied to a video signal.

The deinterlace section 44L and 44R performs deinterlace using interpolation processing for a video signal, for example, as illustrated in FIGS. 3A to 3C and 4, thereby generates the image signal D2Lp or D2Rp including a progressive signal. Here, FIGS. 3A to 3B illustrate a scan line structure, where FIG. 3A illustrates interlace signals, FIG. 3B illustrates progressive signals, and FIG. 3C illustrates progressive signals converted from interlace signals by interpolation processing of scan lines. In FIGS. 3A to 3C, "circles" show scan lines, and "crosses" show interpolated scan lines. In the figures, a vertical direction show a vertical direction V on a screen, and a horizontal direction shows a time direction t.

Figure 4:
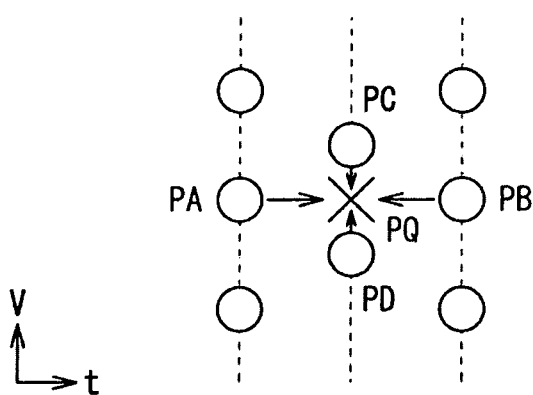
FIG. 4 is another schematic diagram for illustrating an outline of deinterlace applied to a video signal.

As illustrated in FIG. 3A, the interlace signal includes two fields formed by displacing one frame in both the time direction t and the vertical direction V. On the other hand, as illustrated in FIG. 3B, the progressive signal has no displacement in scan line structure. As illustrated in FIG. 3C, scan lines in an interlacedly thinned area are interpolated by surrounding scan lines, thereby the interlace signal is converted to a progressive signal. Specifically, as illustrated in FIG. 4, when an image is still, interfield interpolation is performed, in which an average value of signals PA and PB showing pixels in previous and next fields is set to a signal PQ showing a new pixel indicated by a cross, so that a new scan line is formed. On the other hand, when an image is moving, innerfield interpolation is performed, in which an average value of signals PC and PD showing upper and lower pixels is set to a signal PQ showing a new pixel indicated by the cross, so that a new scan line is formed.

Processing Flow In the Case of Transmitting Film Signal

FIG. 5 is a timing chart illustrating an example of processing flow of an image signal during transmitting a film signal in the three-dimensional image transmission/display system 1. Here, description is made on a case of performing 2-3 pulldown conversion and 2-3 pulldown reverse conversion based on a film image of 24P material. Part (A) and part (B) in FIG. 5 illustrate the film signals FLp and FRp outputted from the film signal source 22, part (C) and part (D) in FIG. 5 illustrate the film signals FLi and FRi outputted from the pulldown processing section 23, and part (E) in FIG. 5 illustrates the transmission signal D0i transmitted from the transmission device 2 to the display device 4. Part (F) and part (G) in FIG. 5 illustrate the image signals D1Li and D1Ri outputted from the serial-parallel separation section 411, and part (H) and part (I) in FIG. 5 illustrate the image signals D2Lp and D2Rp outputted from the deinterlace sections 44L and 44R. In the figure, "LA" to "LD" and "RA" to "RD" show film signals of frames different from one another for left and right eyes, respectively. Among them, "LB" is shown in gray as a picture for description.

In this case, in the three-dimensional image transmission/display system 1, the pulldown processing section in the transmission device 2 performs 2-3 pulldown conversion to each of the film signals FLp and FRp inputted from the film signal source 22, thereby generates the film signals FLi and FRi. Specifically, the film signals FLi and FRi of 60I material are generated based on the film signals FLp and FRp of 24P material. The parallel-serial conversion section 24 performs parallel-serial conversion to such film signals FLi and FRi, thereby generates the transmission data D0i. Thus, the film signal FLi for a left eye and the film signal FRi for a right eye are transmitted in time division to the serial-parallel separation section 411 in the display device 4.

In such processing, as in the case of the video signal, the parallel-serial conversion section 24 alternately transmits the film signal FLi for a left eye and the film signal FRi for a right eye in time division while successively arranging respective film signals of first and second fields along a time axis. Specifically, the transmission data D0i (part (E) in FIG. 5) are transmitted in order of "LA-first interlace", "LA-second interlace", "RA-first interlace", "RA-second interlace", "LB-first interlace", "LB-second interlace", and so on. However, since the transmission data D0i include interlace signals generated by 2-3 pulldown conversion herein, a set of image signals of the same original frame is not necessarily formed. For example, the data are transmitted in order of "LB-first interlace", "LB-second interlace", . . . , "LB-first interlace", and "LC-second interlace" as shown by gray in the figure.

Next, as in the case of the video signal, the serial-parallel separation section 411 in the display device 4 receives the transmission data D0i, and performs serial-parallel conversion of the data, and then supplies image signals for left and right eyes to the field memories 412L and 412R and the like, respectively. Then, each of the pulldown detection sections 42L and 42R detects whether a field being a processing object is resulted from a film image or not. Here, the field being a processing object is determined to be resulted from a film image (an interlace signal including a film signal).

Figure 6:
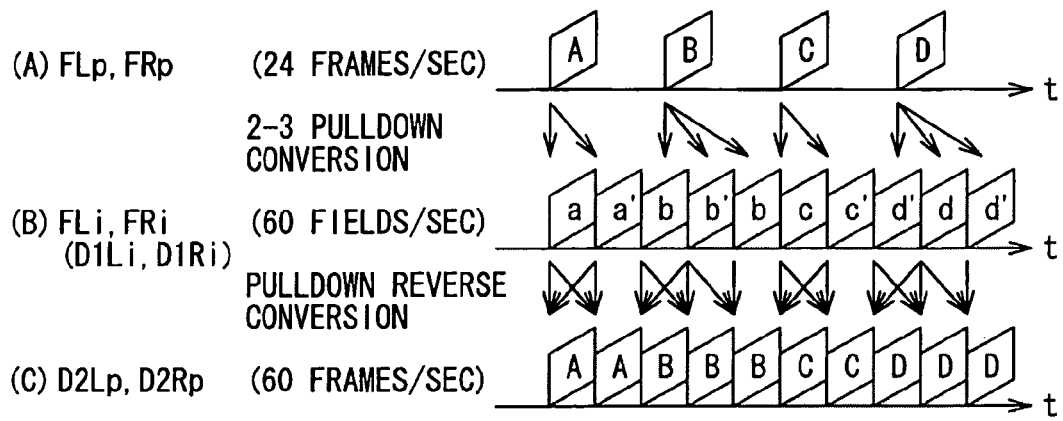
FIG. 6 is a schematic diagram for illustrating an example of pull down processing and deinterlace (pull down reverse conversion) applied to a film signal
Figure 7:
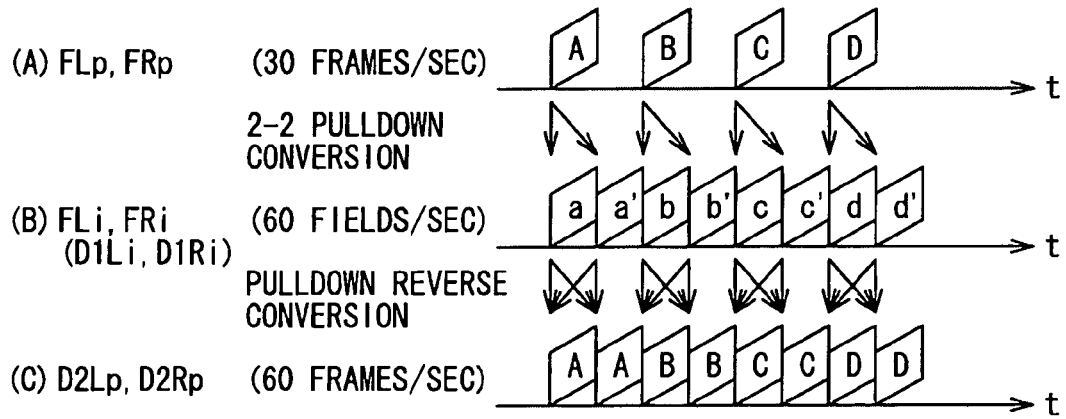
FIG. 7 is a schematic diagram for illustrating another example of pull down processing and deinterlace (pull down reverse conversion) applied to a film signal.

The deinterlace section 44L and 44R perform deinterlace using the pulldown reverse conversion for a film signal, for example, as illustrated in FIG. 6 or 7, thereby generates the image signal D2Lp or D2Rp including a progressive signal.

Specifically, in FIG. 6, the deinterlace section performs 2-3 pulldown conversion processing to image signals FLp and FRp of 24P material each, thereby generates image signals FLi and FRi of 60I material each. Moreover, the deinterlace section performs 2-3 pulldown reverse conversion to the image signals FLi and FRi of 60I material each, thereby generates image signals D2Lp and D2Rp of 60P material each. In the figure, "A" to "D" indicate frame signals, "a" to "d" and "a'" to "d'" indicate field signals, and a mark "'" is used to distinguish between an odd (first) field and an even (second) field.

In contrast, in FIG. 7, the deinterlace section performs 2-2 pulldown conversion processing to image signals FLp and FRp of 30P material each, thereby generates image signals FLi and FRi of 60I material each. Moreover, the deinterlace section performs 2-2 pulldown reverse conversion to the image signals FLi and FRi of 60I material each, thereby generates image signals D2Lp and D2Rp of 60P material each. Three-dimensional image display operation Next, the image signals D2Lp and D2Rp generated by the deinterlace sections 44L and 44R are supplied to the display section 46 in both of the case of the video signal as illustrated in FIGS. 2 to 4 and the case of the film signal as illustrated in FIGS. 5 to 7. The display section 46 performs display operation based on the image signals D2Lp and D2Rp in accordance with a display control signal outputted from the display control section 45. Specifically, a left-eye image based on the image signal D2Lp (see "L" in FIG. 8A) and a right-eye image based on the image signal D2Rp (see "R" in FIG. 8B) are alternately displayed in time division (field sequential display is performed).

Figure 8A:
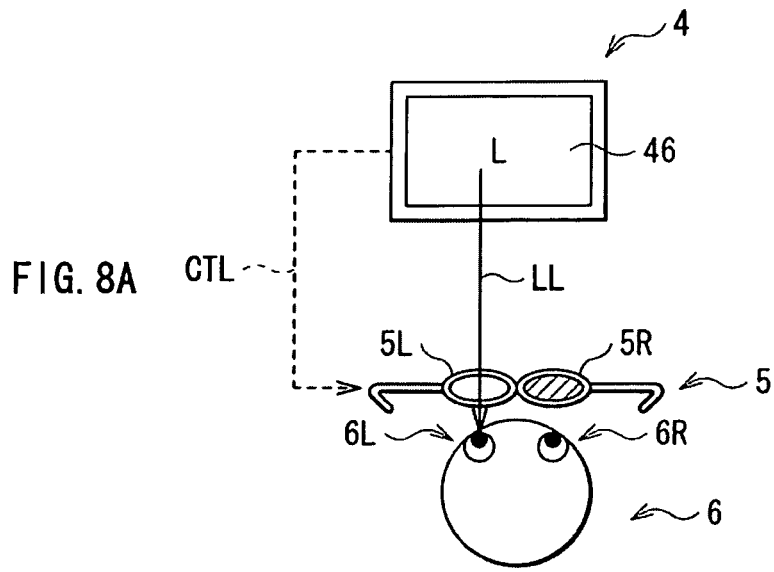
FIGS. 8A and 8B are schematic diagrams for illustrating three-dimensional image display operation of the three-dimensional image transmission/display system illustrated in FIG. 1.
Figure 8B:
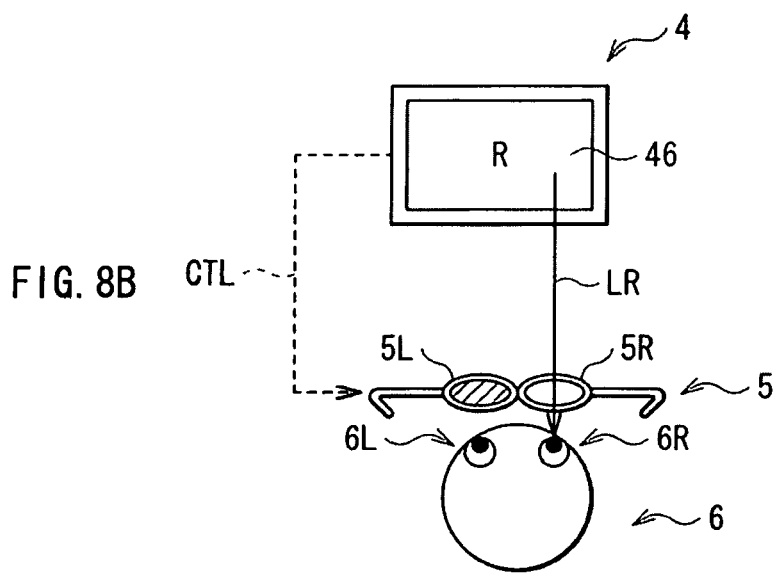

For example, as illustrated in FIG. 8A, in the case of image display for a left eye, the shutter glass 5 used by the viewer 6 is operated according to the control signal CTL such that light-shielding function of a right eye lens 5R is valid, and light-shielding function of a left eye lens 5L is invalid. In contrast, for example, as illustrated in FIG. 8B, in the case of image display for a right eye, the shutter glass 5 is operated according to the control signal CTL such that light-shielding function of the left eye lens 5L is valid, and light-shielding function of the right eye lens 5R is invalid. Such states are alternately repeated, so that the viewer 6 may view a three-dimensional image.

Deinterlace Using Synchronous Control Processing

Next deinterlace using synchronous control processing, which is one of features of the invention, will be described in detail while comparing with a comparative example with reference to FIGS. 9 to 13 in addition to FIGS. 1 to 8A and 8B.

First, description will be made on a difference in display image quality due to generated image signals D2L and D2R between the deinterlace for a video signal described in FIGS. 2 to 4 and the deinterlace using pulldown reverse conversion for a film signal described in FIGS. 5 to 7.

In the deinterlace for a video signal as illustrated in FIGS. 2 to 4, when an image is moving, an average value of signals PC and PD showing upper and lower pixels is set to a signal PQ showing a new pixel indicated by a cross, so that a new scan line is formed, as described before. Therefore, when an image is still, a good converted-image quality having low aliasing and high resolution may be obtained. However, when an image is moving, a bad converted-image quality having high aliasing and low resolution is formed.

On the other hand, in the deinterlace using pulldown reverse conversion for a film signal as illustrated in FIGS. 5 to 7, for example, in the case of 2-3 pulldown, images of originally the same frame are split into 2 or 3 fields. Therefore, if a pulldown sequence such as 2-3 pattern or 2-2 pattern is known, interlace signals may be converted to a progressive signal by performing field interpolation processing regardless of whether an image is still or moving between adjacent fields generated from the same frame. Here, the field interpolation processing is processing where a previous field signal PA or a next field signal PB is set to a signal PQ showing a new pixel, so that a new scan line is formed as in the interfield interpolation processing illustrated in FIG. 4 while being different in interpolation method. Consequently, such deinterlace using pulldown reverse conversion for a film signal may provide a good converted-image quality having low aliasing and high resolution.

In the three-dimensional image transmission/display system 1 of the embodiment, the transmission data D0i are transmitted in such a manner that a film signal FLi for a left eye and a film signal FRi for a right eye are alternately transmitted in time division as described before. Therefore, when each of the pulldown detection sections 42L and 42R determines whether a field being a processing object is resulted from a film image or not by using image correlation, shift in detection processing (determination processing) timing inevitably occurs between image signals for left and right eyes.

Figure 9:
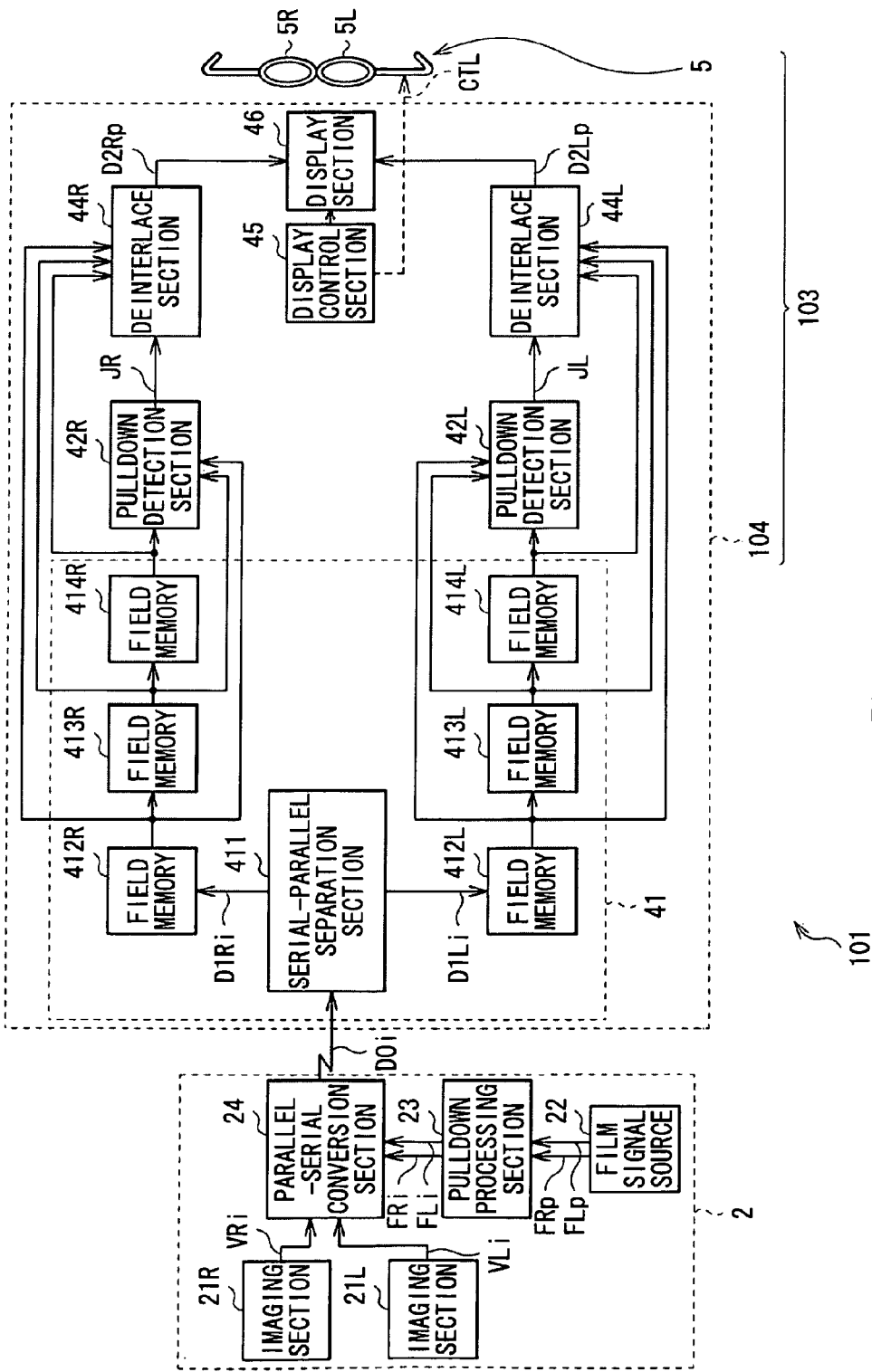
FIG. 9 is a functional block diagram illustrating a configuration of a three-dimensional image transmission/display system according to a comparative example.

From such a reason, the following difficulties occur in a three-dimensional image transmission/display system 101 according to a comparative example as illustrated in FIG. 9 (a synchronous control section 43 is not provided in a three-dimensional image display system 103 and in a display device 104).

Specifically, in the three-dimensional image transmission/display system 101 according to the comparative example, deinterlace sections 44L and 44R perform deinterlace using pulldown reverse conversion independently for each of image signals for left and right eyes. However, since a left-eye image and a right-eye image have parallax and therefore have different images, pulldown detection results in deinterlace are not necessarily the same between a left-eye image signal and a right-eye image signal. That is, the deinterlace applied to the image signals for left and right eyes may be inconveniently divided into processing using pulldown reverse conversion and processing without using pulldown reverse conversion (for example, deinterlace for a video signal).

Figure 10:
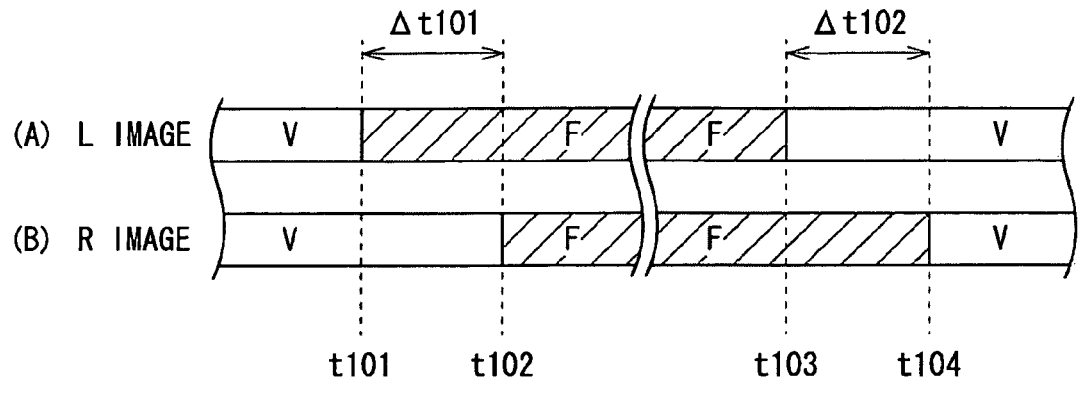
FIG. 10 is a timing chart for illustrating deinterlace of an L image and an R image according to the comparative example.

Specifically, for example, as illustrated in FIG. 10, a period may occur, in which different types of deinterlace are performed between an L (left eye) image and an R (right eye) image. Here, for example, a period Δt101 of timing t101 to timing t102 and a period Δt102 of timing t103 to timing t104 correspond to such a period each. In such a case, quality is different between a left-eye image and a right-eye image, resulting in stress of a viewer of a three-dimensional image (resulting in increased sense of discomfort in image quality). In the figure, "V" indicates a period in which L or R image display is performed based on a video signal, and "F" indicates a period in which L or R image display is performed based on a film signal, and the same is true below. In addition, while a video signal is changed to a film signal in order of an L image and an R image, and a film signal is changed to a video signal in the same order herein, a reverse order of an R image and an L image is also acceptable, and the same is true below.

On the other hand, in the three-dimensional image transmission/display system 1 of the embodiment, the synchronous control section 43 performs synchronous control to the deinterlace sections 44L and 44R based on the detection result signals JL and JR outputted from the pulldown detection sections 42L and 42R. Specifically, the synchronous control section 43 performs synchronous control such that deinterlace for a left eye used by the deinterlace section 44L and deinterlace for a right eye used by the deinterlace section 44R are synchronized with each other in fields so that the same type of processing is used. The same type of deinterlace described herein refers to the deinterlace using the interpolation processing for a video signal or the deinterlace using the pulldown reverse conversion for a film signal.

Figure 11:
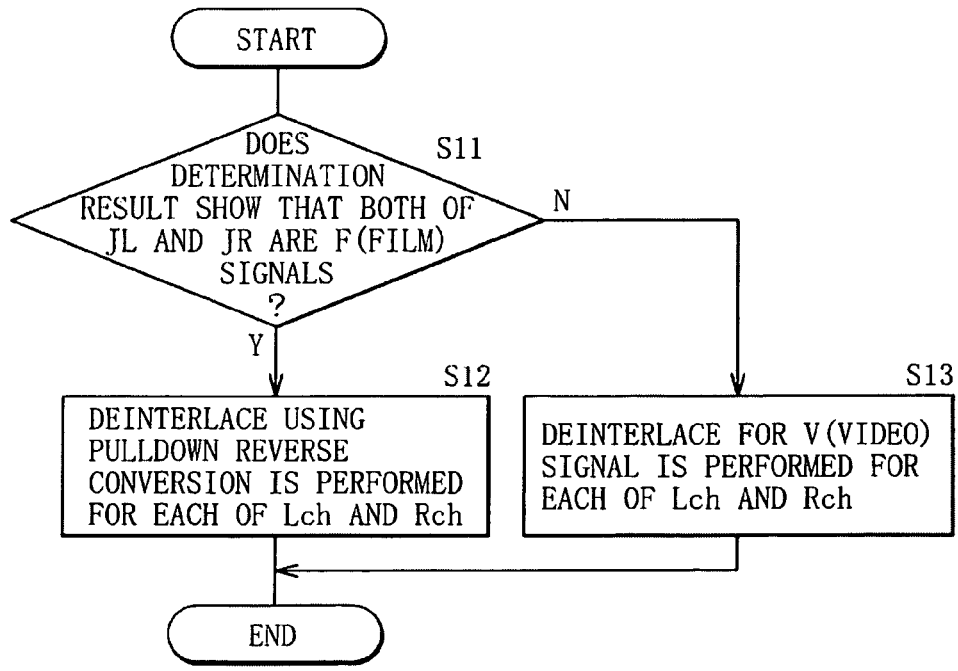
FIG. 11 is a flowchart illustrating an example of synchronous control processing and deinterlace of the three-dimensional image transmission/display system illustrated in FIG. 1.
Figure 12:
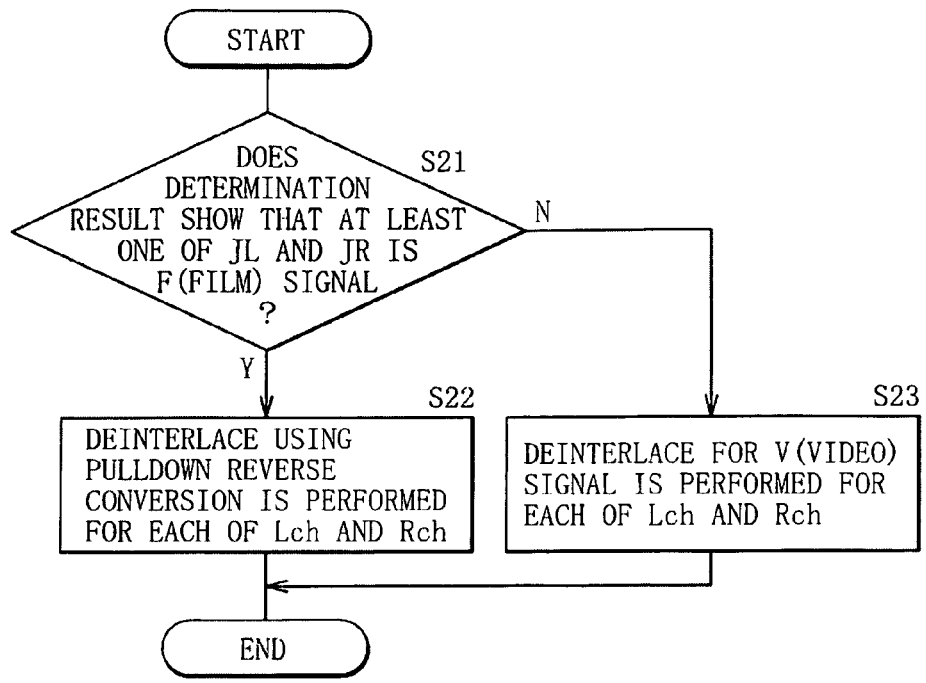
FIG. 12 is a flowchart illustrating another example of synchronous control processing and deinterlace of the three-dimensional image transmission/display system illustrated in FIG. 1.

More specifically, the synchronous control section and the deinterlace sections 44L and 44R perform synchronous control processing and deinterlace, for example, as illustrated in FIG. 11 or 12. Such synchronous control processing is performed at both of switching timing from a video signal (V) to a film signal (F) (first timing), and switching timing from a film signal to a video signal (second timing).

In synchronous control processing and deinterlace as illustrated in FIG. 11, first, the synchronous control section 43 determines whether each of the detection result signals JL and JR from the pulldown detection sections 42L and 42R indicates a determination result of "film signal" or not (step S11). Then, only when each of the detection result signals JL and JR indicates a determination result of "film signal" (step S11:Y), the synchronous control section 43 performs deinterlace using the pulldown reverse conversion for each of Lch (for a left eye) and Rch (for a right eye) (step S12). In contrast, in the case of another determination result (step S11: N), the synchronous control section 43 performs deinterlace using the interpolation processing for a video signal for each of Lch and Rch (step S13).

On the other hand, in synchronous control processing and deinterlace illustrated in FIG. 12, first, the synchronous control section 43 determines whether at least one of the detection result signals JL and JR from the pulldown detection sections 42L and 42R indicates a determination result of "film signal" or not (step S21). Then, when at least one of the detection result signals JL and JR indicates a determination result of "film signal" (step S21: Y), the synchronous control section 43 performs deinterlace using the pulldown reverse conversion for each of Lch and Rch (step S22). In contrast, only when each of the detection result signals JL and JR indicates a determination result of "video signal", (step S21: N), the synchronous control section 43 performs deinterlace using the interpolation processing for a video signal for each of Lch and Rch (step S23).

Figure 13:
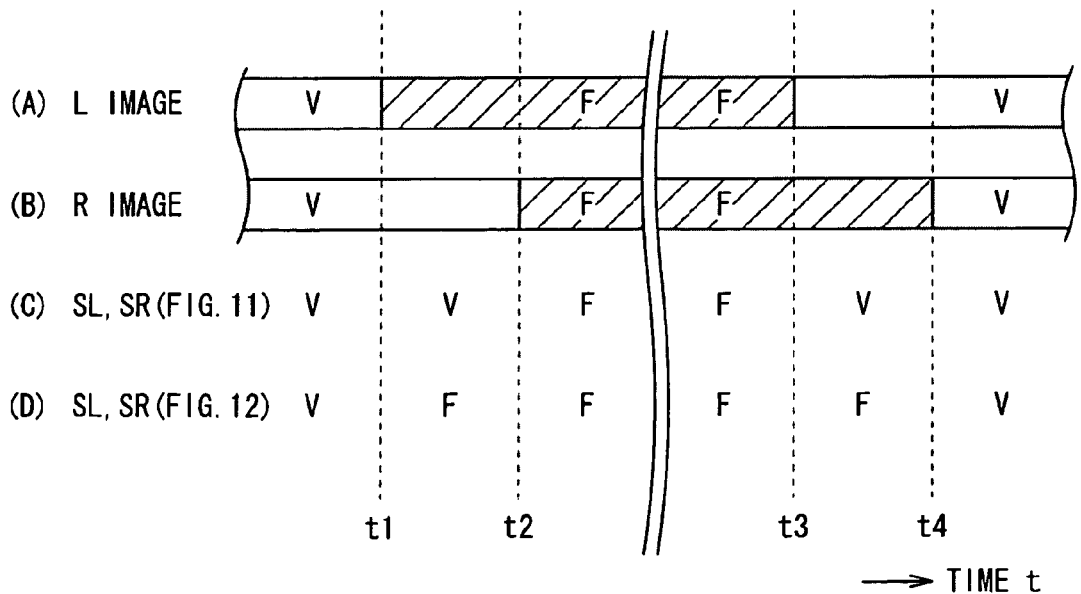
FIG. 13 is a timing chart for illustrating deinterlace of an L image and an R image illustrated in FIGS. 11 and 12.

According to the synchronous control processing and the deinterlace, deinterlace for each of left and right eyes is performed, for example, as illustrated in FIG. 13 in the embodiment. In part (C) and part (D) in FIG. 13, "V" indicates a period in which deinterlace for a video signal is performed, and "F" indicates a period in which deinterlace using the pulldown reverse conversion for a film signal is performed, and the same is true below.

In the embodiment, deinterlace for a left eye used by the deinterlace section 44L and deinterlace for a right eye used by the deinterlace section 44R are synchronized with each other in fields so that the same type of processing is used. Specifically, the same type of deinterlace is performed for each of Lch and Rch even in a period of timing t1 to timing t2 and in a period of timing t3 to timing t4 (period in which shift in detection processing (determination processing) timing occurs between an L image and an R image) unlike the comparative example illustrated in FIG. 10. Thus, a difference in image quality is reduced (preferably avoided) between a left-eye image and a right-eye image displayed by the display section 46.

As hereinbefore, in the embodiment, the pulldown detection sections 42L and 42R perform pulldown detection processing for left and right eyes, respectively, and the synchronous control section 43 performs synchronous control to the deinterlace sections 44L and 44R based on the detection result signals JL and JR such that deinterlace for a left eye used by the deinterlace section 44L and deinterlace for a right eye used by the deinterlace section 44R are synchronized with each other in fields so that the same type of processing is used. Therefore, a difference in image quality may be reduced or avoided between a left-eye image and a right-eye image displayed by the display section 46. Accordingly, sense of discomfort in image quality may be reduced during viewing a three-dimensional image, and consequently a high-quality three-dimensional image may be provided.

For example, in the case of performing the synchronous control processing and the deinterlace as illustrated in FIG. 11, only when each of the detection result signals JL and JR indicates a determination result of "film signal", the synchronous control section 43 performs deinterlace using the pulldown reverse conversion for each of Lch and Rch, therefore wrong determination is decreased compared with a case illustrated in FIG. 12, and consequently a higher-quality image may be obtained.

Furthermore, when the synchronous control processing and the deinterlace as illustrated in FIG. 11 or 12 are performed, strict determination is made compared with the following modifications 1 and 2, and therefore deinterlace causing less stress may be performed.

Modifications (Modifications 1 And 2)

Figure 14:
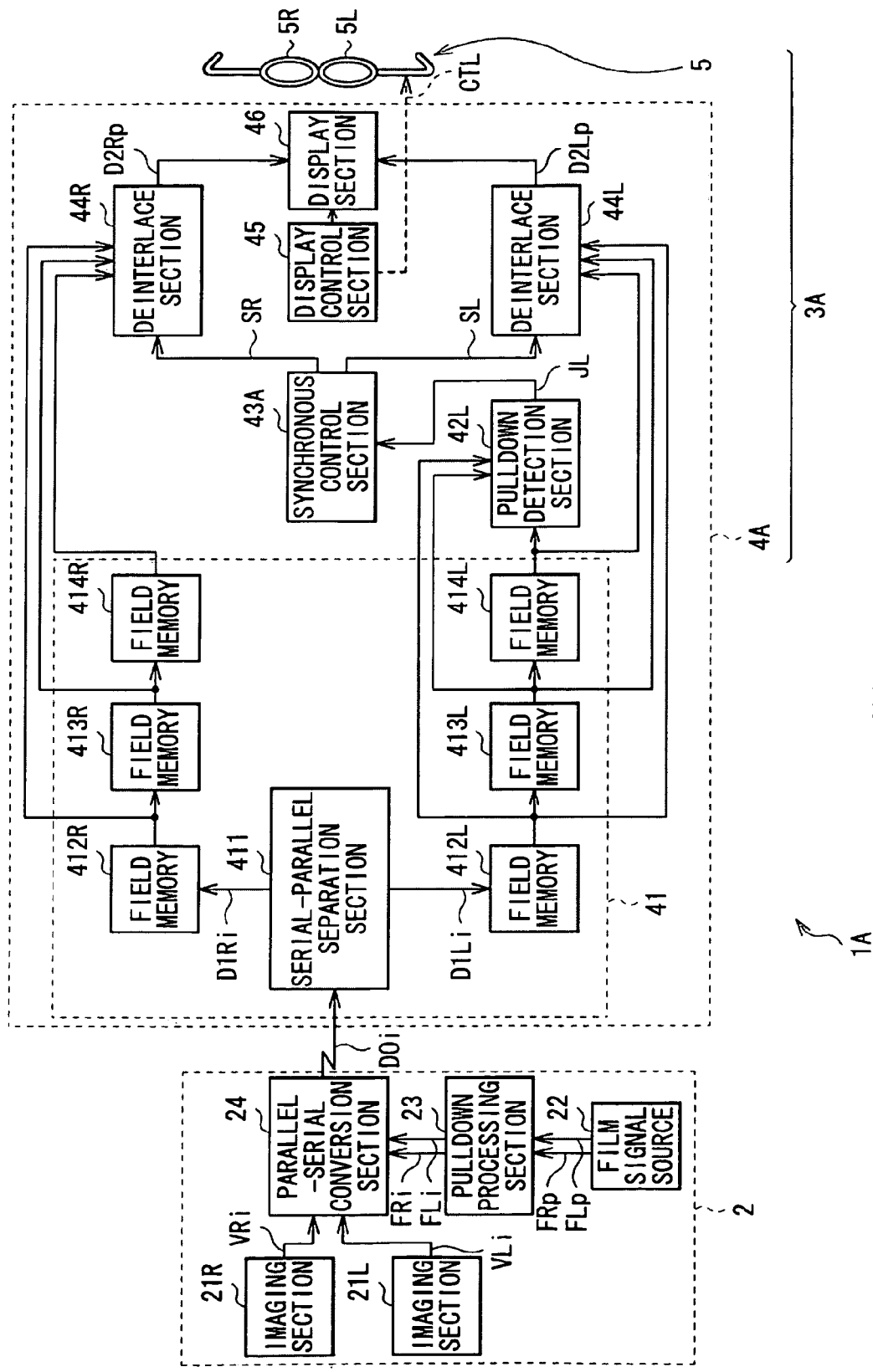
FIG. 14 is a functional block diagram illustrating a configuration of a three-dimensional image transmission/display system according to modification 1 of the invention.
Figure 15:
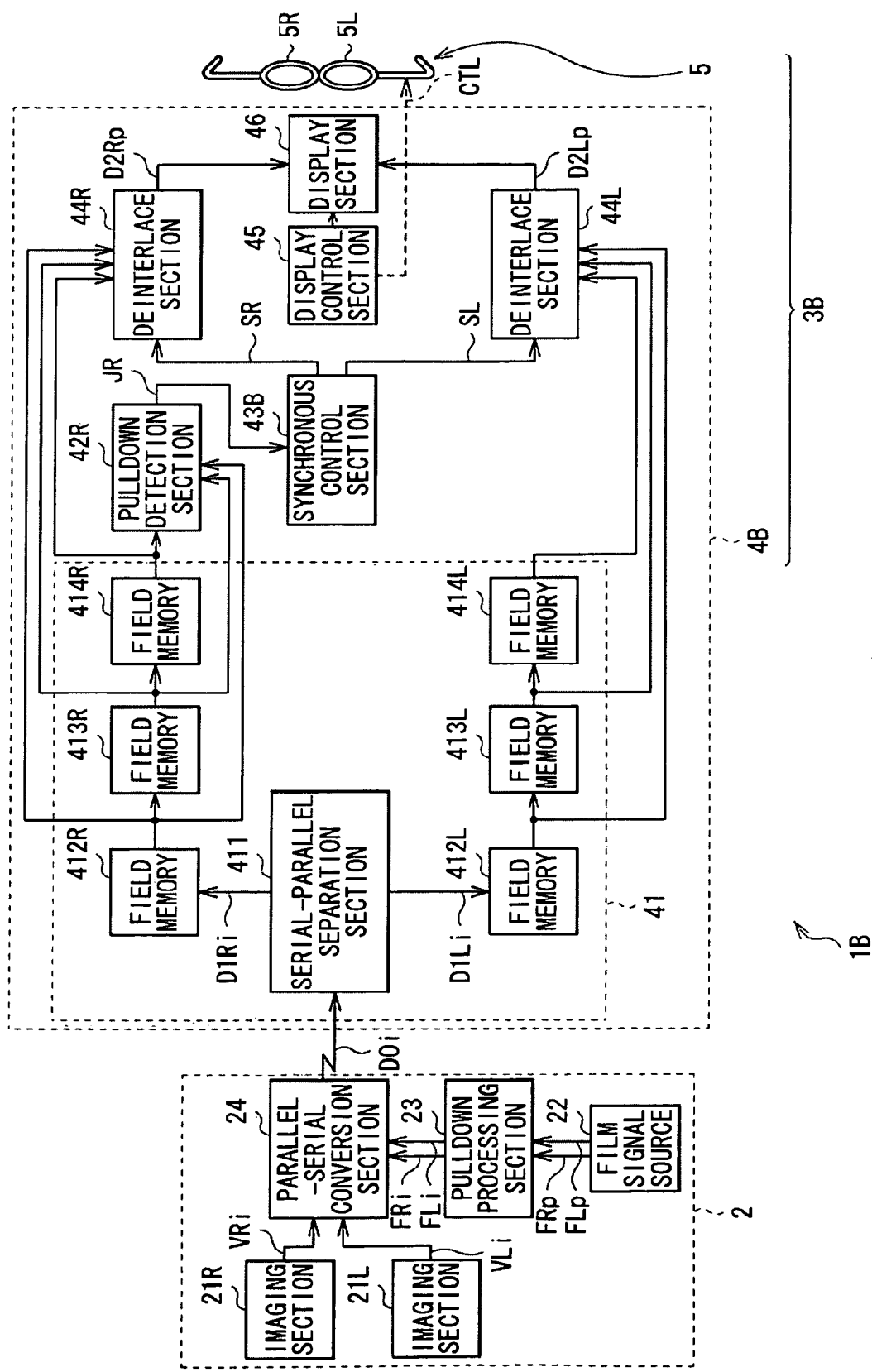
FIG. 15 is a functional block diagram illustrating a configuration of a three-dimensional image transmission/display system according to modification 2 of the invention

Next, modifications of the embodiment of the invention will be described. The same components as in the embodiment are marked with the same reference numerals or signs, and description of them is appropriately omitted FIG. 14 shows a functional block configuration of a three-dimensional image transmission/display system 1A according to modification 1 of the embodiment of the invention, and FIG. 15 shows a functional block configuration of a three-dimensional image transmission/display system 1B according to modification 2 of the embodiment of the invention. In the three-dimensional image transmission/display system 1A or 1B, a display device 4A or 4B in a three-dimensional image display system 3A or 3B has a synchronous control section 43A or 43B in place of the synchronous control section 43, and does not have one of the pulldown detection sections 42L and 42R.

Specifically, in the three-dimensional image transmission/display system 1A according to the modification 1, the display device 4A does not have the pulldown detection section 42R in the embodiment, and has only the pulldown detection section 42L. The synchronous control section 43A performs synchronous control processing to both deinterlace sections 44L and 44R simply based on a detection result signal JL from the pulldown detection section 42L.

Figure 16:
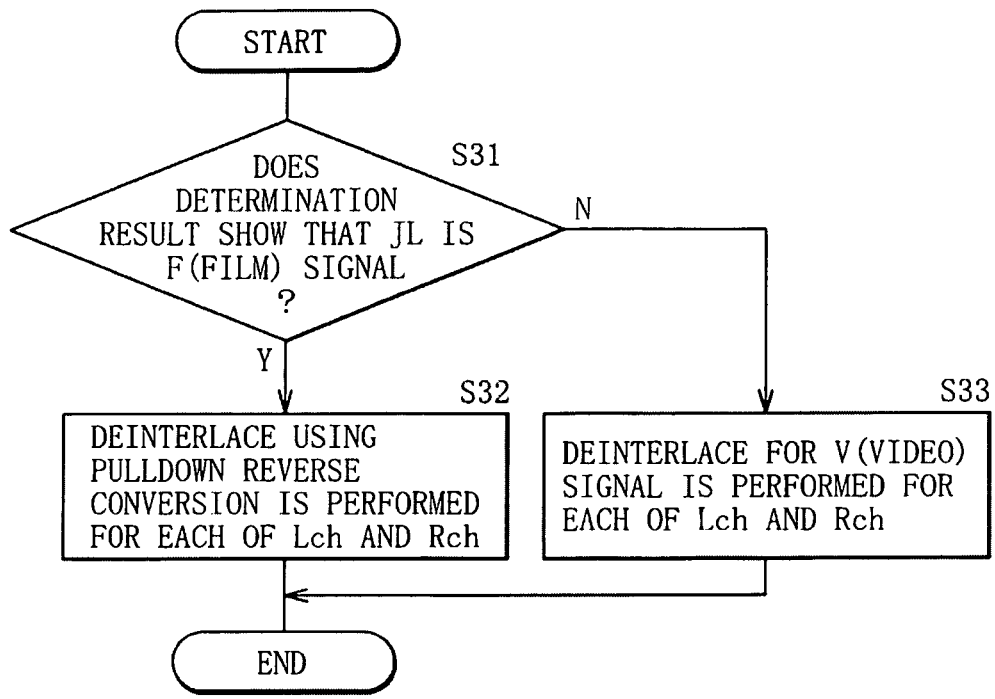
FIG. 16 is a flowchart illustrating synchronous control processing and deinterlace according to the modification 1.

More specifically, the synchronous control section 43A and the deinterlace sections 44L and 44R perform synchronous control processing and deinterlace, for example, as illustrated in FIG. 16. Specifically, first, the synchronous control section 43A determines whether the detection result signal JL from the pulldown detection section 42L indicates a determination result of "film signal" or not (step S31). Then, when the detection result signal JL indicates a determination result of "film signal" (step S31: Y), the synchronous control section 43A performs deinterlace using the pulldown reverse conversion for each of Lch and Rch (step S32). In contrast, when the detection result signal JL indicates a determination result of "video signal" (step S31: N), the synchronous control section 43A performs deinterlace using the interpolation processing for a video signal for each of Lch and Rch (step S33).

On the other hand, in the three-dimensional image transmission/display system 1B according to the modification 2, the display device 4B does not have the pulldown detection section 42L in the embodiment, and has only the pulldown detection section 42R. The synchronous control section 43B performs synchronous control processing to both the deinterlace sections 44L and 44R simply based on a detection result signal JR from the pulldown detection section 42R.

Figure 17:
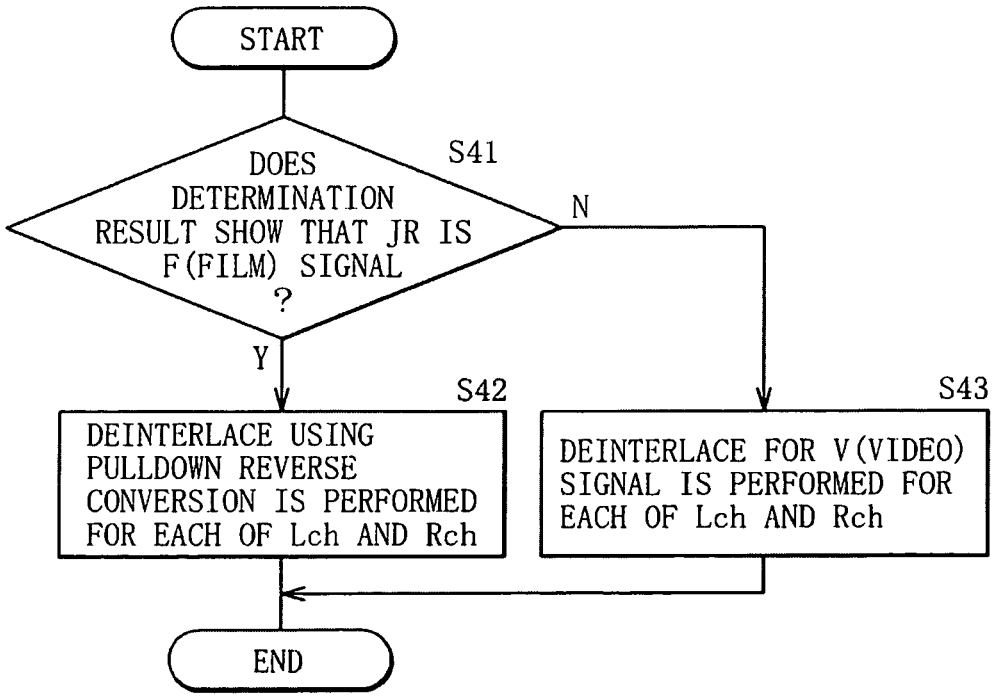
FIG. 17 is a flowchart illustrating synchronous control processing and deinterlace according to the modification 2.

More specifically, the synchronous control section 43B and the deinterlace sections 44L and 44R perform synchronous control processing and deinterlace, for example, as illustrated in FIG. 17. Specifically, first, the synchronous control section 43B determines whether the detection result signal JR from the pulldown detection section 42R indicates a determination result of "film signal" or not (step S41). Then, when the detection result signal JR indicates a determination result of "film signal" (step S41: Y), the synchronous control section performs deinterlace using the pulldown reverse conversion for each of Lch and Rch (step S42). In contrast, when the detection result signal JR indicates a determination result of "video signal" (step S41: N), the synchronous control section performs deinterlace using the interpolation processing for a video signal for each of Lch and Rch (step S43).

Figure 18:
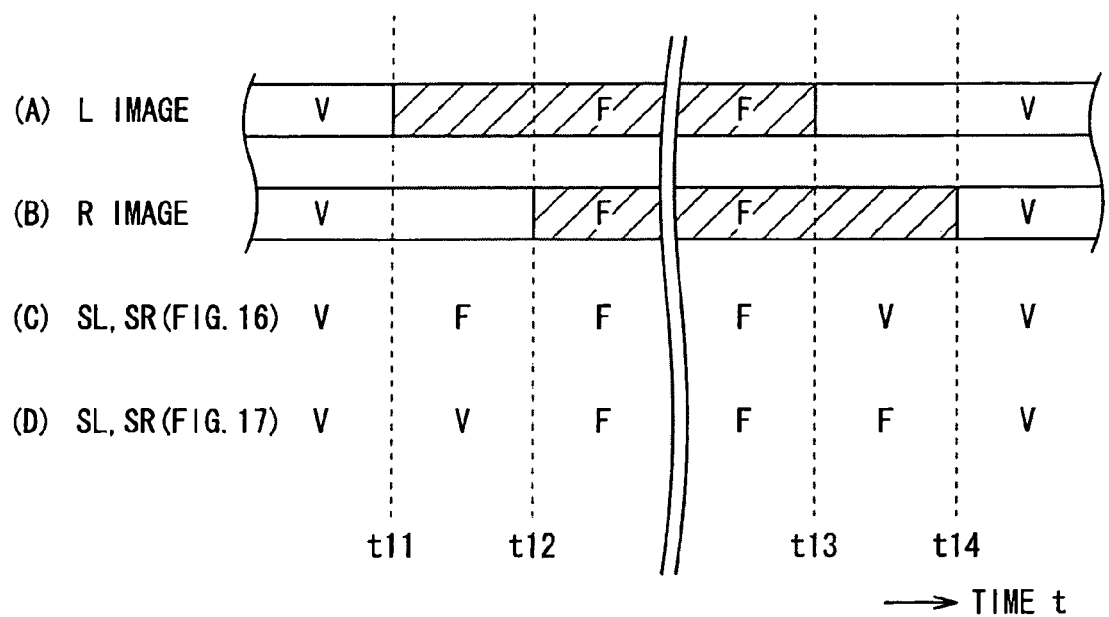
FIG. 18 is a timing chart for illustrating deinterlace of an L image and an R image according to the modifications 1 and 2.

According to the synchronous control processing and the deinterlace, deinterlace for each of left and right eyes is performed, for example, as illustrated in FIG. 18 in the modifications 1 and 2. Specifically, the same type of deinterlace is performed for each of Lch and Rch even in a period of timing t1 to timing t2 or in a period of timing t3 to timing t4 (period in which shift in detection processing (determination processing) timing occurs between an L image and an R image)

In this way, even in the modifications 1 and 2, the same advantage may be obtained by the same operation as in the embodiment. Specifically, since a difference in image quality may be reduced or avoided between a left-eye image and a right-eye image, sense of discomfort in image quality may be reduced during viewing a three-dimensional image, and consequently a high-quality three-dimensional image may be provided. In addition, in the modifications, one of the pull-down detection sections 42L and 42R may be removed, which may simplify a system configuration compared with the embodiment, resulting in cost reduction.

In the modifications, since only one of determination results for left and right eyes is used for each deinterlace, it may be preferable that a determination criterion in pulldown detection is set considerably strict so as to prevent wrong detection.

Moreover, when both the pulldown detection sections 42L and 42R are provided as in the embodiment, only one of determination results for left and right eyes may be used for each deinterlace.

While the invention has been described with the embodiment and the modifications hereinbefore, the invention is not limited to the embodiment and the like, and may be variously modified or altered.

For example, a synchronous control method may be optionally changed at switching timing from a video signal to a film signal, and at switching timing from a film signal to a video signal. That is, among the plural types of synchronous control processing as illustrated in FIGS. 11, 12, 16 and 17, a type of synchronous control processing at the switching timing from a video signal to a film signal may be different from that at the switching timing from a film signal to a video signal.

While the embodiment and the like have been described with the 2-3 pulldown and the 2-2 pulldown as examples, the invention may be used for other types of pulldown.

Furthermore, while the embodiment and the like have been described on a case where a three-dimensional image transmission/display system and a three-dimensional image display system include a shutter glass each, the systems may not include the shutter glass.

In addition, while the embodiment and the like have been described on a display device used for a three-dimensional image transmission/display system, the invention may be used for a display device used for a system other than the three-dimensional image transmission/display system.

In addition, a series of processing described in the embodiment and the like may be performed by either of hardware and software. When the series of processing are performed by software, a program configuring the software is installed in a general-purpose computer or the like. Such a program may be beforehand recorded in a recording medium incorporated in a computer.

It should be understood by those skilled in the art that various modifications, combinations, sub-combinations and alterations may occur depending on design requirements and other factors insofar as they are within the scope of the appended claims or the equivalent thereof.

What is claimed is:

1. An image signal processing device comprising:
    a determination section performing determination, for each of fields, on a first input image signal as an interlaced signal or a second input image signal as an interlaced signal having horizontal parallax to the first input image signal or both thereof, the determination being concerned with whether an input image signal is an interlaced signal derived from video signal or from pull-down-converted film signal;
    deinterlace sections performing deinterlace, for each of fields, on each of the first and second input image signals, through use of interpolation for a video signal or pull down reverse conversion for a film signal, thereby generating a first output image signal as a progressive signal and a second output image signal as a progressive signal having horizontal parallax to the first output image signal; and
    a synchronous control section performing synchronous control to the deinterlace sections, based on a determination result of the determination section, such that deinterlace applied to the first input image signal and deinterlace applied to the second input image signal, synchronized with each other for each of fields, are of same type,
    wherein the determination section provides a first indication indicating whether the first input image signal is an interlaced signal derived from video signal or from pull-down-converted film signal, and a second indication indicating whether the second input image signal is an interlaced signal derived from video signal or from pull-down-converted film signal, and wherein a comparison is made between the first indication and second indication, and the deinterlace applied to the first input image signal and the second input image signal is based on the comparison.

2. The image signal processing device according to claim 1, wherein
    the determination section performs the determination independently for each of the first and second input image signals, and
    the synchronous control section performs the synchronous control such that,
    only when both of the first and second input image signals are determined to be the interlaced signals derived from the pull down-converted film signals, the deinterlace through use of the pull down reverse conversion is applied to both of the first and second input image signals, and
    when resulting in another determination, the deinterlace through use of the interpolation is applied to both of the first and second input image signals.

3. The image signal processing device according to claim 1, wherein
    the determination section performs the determination independently for each of the first and second input image signals, and
    the synchronous control section performs the synchronous control such that,
    when the first input image signal or a second input image signal or both thereof are determined to be the interlaced signals derived from the pull down-converted film signals, the deinterlace through use of the pull down reverse conversion is applied to both of the first and second input image signals, and
    only when both of the first and second input image signals are determined to be the interlaced signal derived from the video signal, the deinterlace through use of the interpolation is applied to both of the first and second input image signals.

4. The image signal processing device according to claim 1 wherein
    the determination section performs the determination for only one of the first and second input image signals, and the synchronous control section performs the synchronous control such that, when the one input image signal is determined to be the interlaced signal derived from the pull down-converted film signal, the deinterlace through use of the pull down reverse conversion is applied to both of the first and second input image signals, and when the one input image signal is determined to be the interlaced signal derived from the video signal, the deinterlace through use of the interpolation is applied to both of the first and second input image signals.

5. The image signal processing device according to claims 1, wherein the synchronous control section performs the synchronous control to each of the first and second input image signals at both of first and second timings, the first timing corresponding to a switching timing from the interlaced signal derived from the video signal to the interlaced signal derived from the pull down-converted film signal, and the second timing corresponding to a switching timing from the interlaced signal derived from the pull down-converted film signal to the interlaced signal derived from the video signal.

6. The image signal processing device according to claim 5, wherein the synchronous control section is configured to optionally change type of deinterlace under the synchronous control at the first timing and at the second timing.

7. The image signal processing device according to claim 1, wherein the interlaced signal derived from the pull down-converted film signal is obtained by pull down conversion of a progressive signal of 24P, 25P, 30P, 12P or 8P.

8. A three-dimensional image display device comprising:

a determination section performing determination, for each of fields, on a first input image signal as an interlaced signal or a second input image signal as an interlaced signal having horizontal parallax to the first input image signal or both thereof, the determination being concerned with whether an input image signal is an interlaced signal derived from video signal or from pull down-converted film signal;

deinterlace sections performing deinterlace, for each of fields, on each of the first and second input image signals, through use of interpolation for a video signal or pull down reverse conversion for a film signal, thereby generating a first output image signal as a progressive signal and a second output image signal as a progressive signal having horizontal parallax to the first output image signal; and a synchronous control section performing synchronous control to the deinterlace sections, based on a determination result of the determination section, such that deinterlace applied to the first input image signal and deinterlace applied to the second input image signal, synchronized with each other for each of fields, are of same type; and a display section alternately displaying, in time division, left-eye image based on the first output image signal and right-eye image based on the second output image signal, wherein the determination section provides a first indication indicating whether the first input image signal is an interlaced signal derived from video signal or from pull-down-converted film signal, and a second indication indicating whether the second input image signal is an interlaced signal derived from video signal or from pull-down-converted film signal, and wherein a comparison is made between the first indication and second indication, and the deinterlace applied to the first input image signal and the second input image signal is based on the comparison.

9. A three-dimensional image transmission/display system comprising:

a transmission device transmitting a first input image signal as an interlaced signal or a second input image signal as an interlaced signal having horizontal parallax to the first input image signal; and a three-dimensional image display device receiving the first and second input image signals transmitted from the transmission device, and performing three-dimensional image display based on the first and second input image signals;

wherein the transmission device has a parallel-serial conversion section transmitting the first and second input image signals to the three-dimensional image display device in time division, and the three-dimensional image display has a serial-parallel conversion section separating an input image signal received from the transmission device into the first input image signal and the second input image signal, a determination section performing determination, for each of fields, on the first or second input image signal supplied from the serial-parallel conversion section or both thereof, the determination being concerned with whether an input image signal is an interlaced signal derived from video signal or from pull down-converted film signal;

deinterlace sections performing deinterlace, for each of fields, on each of the first and second input image signals supplied from the serial-parallel conversion section, through use of interpolation for a video signal or pull down reverse conversion for a film signal, thereby generating a first output image signal as a progressive signal and a second output image signal as a progressive signal having horizontal parallax to the first output image signal; and a synchronous control section performing synchronous control to the deinterlace sections, based on a determination result of the determination section, such that deinterlace applied to the first input image signal and deinterlace applied to the second input image signal, synchronized with each other for each of fields, are of same type, and a display section alternately displaying, in time division, left-eye image based on the first output image signal and right-eye image based on the second output image signal, wherein the determination section provides a first indication indicating whether the first input image signal is an interlaced signal derived from video signal or from pull-down-converted film signal, and a second indication indicating whether the second input image signal is an interlaced signal derived from video signal or from pull-down-converted film signal, and wherein a comparison is made between the first indication and second indication, and the deinterlace applied to the first input image signal and the second input image signal is based on the comparison.

10. The three-dimensional image transmission/display system according to claim 9, wherein the parallel-serial conversion section alternately transmits the first input image signal and the second input image signal in time division while successively arranging a first field image signal and a second field image signal along a time axis for each of the first and second input image signals.

11. An image signal processing method comprising steps of:

performing determination, for each of fields, on a first input image signal as an interlaced signal or a second input image signal as an interlaced signal having horizontal parallax to the first input image signal or both thereof, the determination being concerned with whether an input image signal is an interlaced signal derived from video signal or from pull down-converted film signal;

performing deinterlace, for each of fields, on each of the first and second input image signals, through use of interpolation for a video signal or pull down reverse conversion for a film signal, thereby generating a first output image signal as a progressive signal and a second output image signal as a progressive signal having horizontal parallax to the first output image signal; and performing synchronous control in the step of performing deinterlace, based on a determination result in the step of performing determination, such that deinterlace applied to the first input image signal and deinterlace applied to the second input image signal, synchronized with each other for each of fields, are of same type, wherein the determination provides a first indication indicating whether the first input image signal is an interlaced signal derived from video signal or from pulldown-converted film signal, and a second indication indicating whether the second input image signal is an interlaced signal derived from video signal or from pulldown-converted film signal, and wherein a comparison is made between the first indication and second indication, and the deinterlace applied to the first input image signal and the second input image signal is based on the comparison.

* * * * *